United States Patent [19]

Ogawa

[11] Patent Number: 4,487,475
[45] Date of Patent: Dec. 11, 1984

[54] LIGHTGUIDE AND PROCESS FOR PRODUCING THE SAME USING A PHOTO-SETTING ADHESIVE

[75] Inventor: Kazufumi Ogawa, Hirakata, Japan

[73] Assignee: Matsushita Electric Industrial Co., Ltd., Kadoma, Japan

[21] Appl. No.: 295,370

[22] Filed: Aug. 24, 1981

[30] Foreign Application Priority Data

Sep. 1, 1980 [JP] Japan .............................. 55-121645

[51] Int. Cl.³ .............................................. G02B 7/26
[52] U.S. Cl. .................................. 350/96.21; 156/158
[58] Field of Search ............... 350/96.20, 96.21, 96.22; 156/158, 307.1

[56] References Cited

U.S. PATENT DOCUMENTS 4,378,954  4/1983  Baker .......................... 350/96.20 X
4,436,366  3/1984  Abramson ..................... 350/96.20

FOREIGN PATENT DOCUMENTS 107745  8/1979  Japan ............................. 350/96.21

OTHER PUBLICATIONS

*T & B Data Sheet TL-1*, "Narrow Profile Splice for 125 to 140 Micron O.D. Optical Waveguides," Jun. 1979, 2 pp.

Primary Examiner—John D. Lee
Attorney, Agent, or Firm—Stevens, Davis, Miller & Mosher

[57] ABSTRACT

The disclosed invention provides a lightguide and a process for connecting optical fibers to produce it by which there is obtained a lightguide having a small light loss at the point of connection and which permits easy removal of excess (leaked out) adhesive at the point of adhesion. In the connecting process, at the time of connecting the optical fibers together, only the adhesive held between the end surfaces of plural optical fibers is cured without curing the excess part of the adhesive protruding out of the end surfaces of the optical fibers so that the excess part of the adhesive can easily be removed with an organic solvent or the like.

6 Claims, 4 Drawing Figures

LIGHTGUIDE AND PROCESS FOR PRODUCING THE SAME USING A PHOTO-SETTING ADHESIVE

BACKGROUND OF THE INVENTION

This invention relates to a lightguide for use in communications or the like, and to a process for producing it. Particularly, this invention provides an optical fiber which, during connection, easily has removed therefrom an unnecessary part (leaked out part) of adhesive and which has excellent optical characteristics, and a process for connecting said optical fiber.

That is, this invention provides a lightguide excellent in optical characteristics from which said unnecessary part of adhesive can easily be removed with organic solvent or the like by curing, at the time of connecting optical fibers, only the adhesive held between the end surfaces of plural fibers without curing the unnecessary part of adhesive protruding out of the end surfaces of optical fibers, and a process for producing it.

For connecting optical fibers, there have hitherto been proposed various processes as follows: (1) a process which comprises tightly contacting together the end surfaces of two optical fibers so that their fiber axes coincide with each other and fusing and bonding the contact part of the end surfaces with hydrogen burner, arc or the like, (2) a process which comprises tightly contacting together the end surfaces of two optical fibers through intermediation of a thermosetting adhesive so that their axes coincide with each other and then heating them to cure the adhesive, and (3) a process which comprises placing silicone oil or the like in a prescribed cylinder, inserting optical fibers thereinto from both ends of the cylinder, uniting both the end surfaces through intermediation of silicone oil and thereby bonding the optical fibers inside the cylinder.

However, in processes (1) and (2), the glass thickens at the bonded part and remains there or the adhesive partially protrudes out of the bonded part and its lump 1 remains there as shown in FIG. 1. As a result, there occurs an irregular reflection at the connected part of optical fiber 2 which has been an important cause of a drop in transmission efficiency when optical fiber 2 is used for optical communication or the like. (In the figure, the arrows indicate the path of transmitted light.)

Process (2) has the problem that the optical axes of the optical fibers slip out of position before the adhesive cures if an adhesive having a long curing time is used and that air bubbles present in the adhesive at the connected part are quite difficult to remove if an instantaneous adhesive of the cyanoacrylate type or the like is used.

Process (3) has the problem that it is low in fidelity in the transmission of optical signals because silicone oil or the like is sealed in the cylinder.

OBJECT OF THE INVENTION

This invention has been devised to overcome and eliminate the above-mentioned problems with hitherto known optical fibers and the processes for connecting them, and the object of this invention consists in providing a lightguide having a high efficiency of light transmission and a process for producing it.

Hereunder, examples of this invention will be explained in detail with reference to drawings.

EXAMPLE 1

Figure 1:
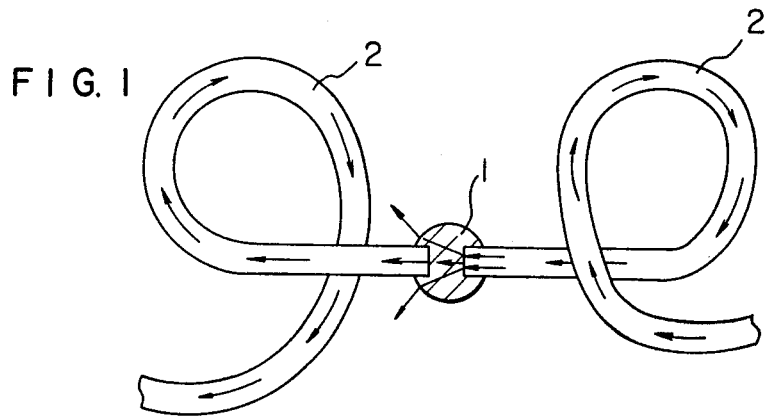
FIG. 1 is a view of the connected part of optical fibers and its neighborhood, wherein hitherto known process for connecting optical fibers is used.
Figure 2:
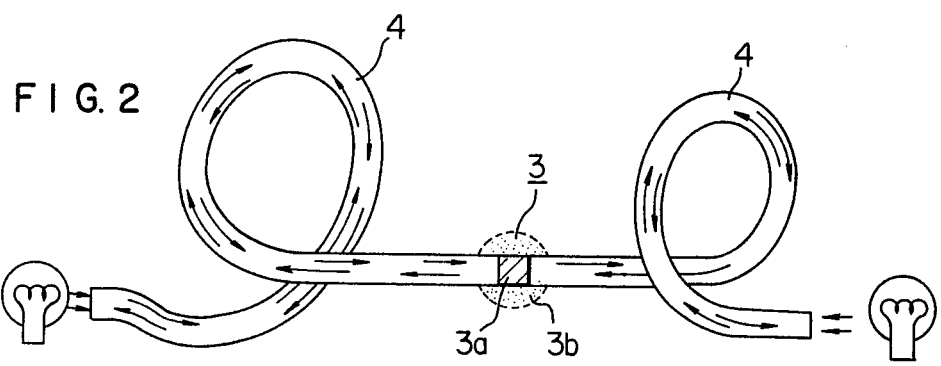
FIG. 2 and FIG. 3 are figures for illustrating the lightguide and the process for producing it in one example of this invention.
Figure 3:
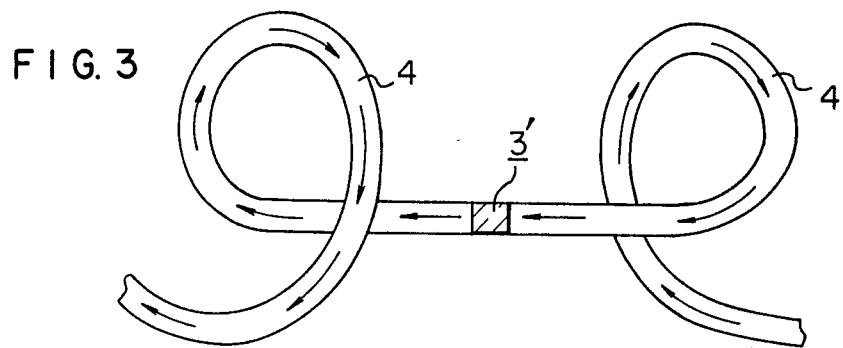

As shown in FIG. 2, the end surfaces of two optical fibers 4 are tightly contacted together through intermediation of a photo-setting type adhesive 3 [(for example, Norland NOA-61 resin (a trademark for thiol-ene series adhesive, manufactured by and sold from Norland Co. U.S.A.) curable with ultraviolet rays, or the like)] and air bubbles present in the adhesive are removed, after which their optical axes are adjusted. Then, as shown in FIG. 2, a light is projected into the optical fibers 4 from both the ends opposite to the connected part by the use of a light source. Thus, the adhesive is cured only by the light which has passed inside the optical fibers 4 (the light is an ultraviolet ray when an ultraviolet ray-curable adhesive is used). That is, the cure of photo-setting type adhesive 3 used for connection progresses only in part 3a held between the end surfaces of optical fibers 4. Then, the protruding and uncured adhesive 3b is washed away with an organic solvent such as toluene or the like, whereby connection of optical fibers can be carried out so as to produce a very smooth bonding part, as shown in FIG. 3.

EXAMPLE 2

Figure 4:
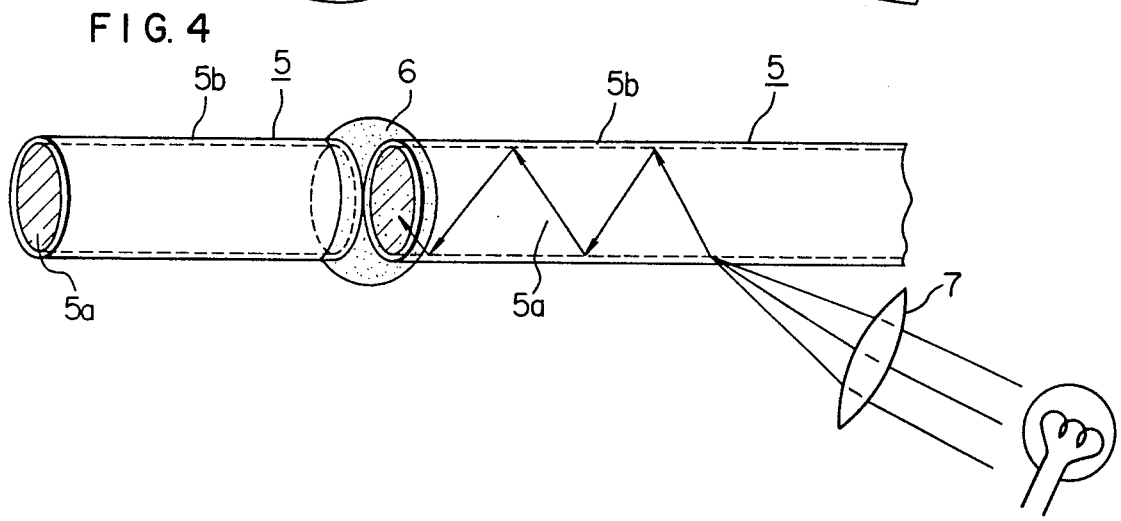
FIG. 4 is a figure for illustrating the process for producing a lightguide in another example of this invention.

Next, another example of this invention will be explained with reference to FIG. 4. For example, in connecting optical fibers 5 wherein core 5a is made of pure quarz glass ($SiO_2$) and clad 5b is made of high silica glass containing 80% or more of $SiO_2$, an ultraviolet ray-setting type adhesive such as NOA-61 (a trademark) or the like is used as the photo-setting type adhesive 6, and the optical fibers are contacted together with pressure through intermediation of the adhesive so that the thickness of the photo-setting type adhesive 6 becomes about several microns, in a state that the optical axes of the optical fibers 5 coincide with each other. Then, as shown in FIG. 4, ultraviolet rays condensed by means of quarz lens 7 are projected from the lateral side of the neighborhood of the bonded part of optical fibers 5. Thus, bonding can be achieved in several tens of seconds, e.g. 10.60 seconds. Since clad 5b of optical fiber 5 is made so as to have a smaller refractive index than core 5a, the light can easily be projected from the lateral side and, in addition, the light once projected into core 5a is totally reflected at the interface between clad 5b and core 5a and does not leave core 5a as indicated in FIG. 4 by the light path depicted by arrows, so that the light can be utilized effectively to cure photo-setting type adhesive 6.

It is needless to say in this example that the process for curing the photo-setting type adhesive by projecting the light from the end surfaces of optical fibers can also be employed in the same manner as in the preceding example.

Although connection of two optical fibers was mentioned above as examples of the process for connecting optical fibers, it is needless to say that the process of this invention is also applicable to Y-formed connection by the use of three optical fibers, X-formed connection by the use of four optical fibers, and other connections using plural optical fibers.

Further, many kinds of photo-setting type adhesives are commercialized at the present time, so that an adhesive having necessary refractive index is quite readily available.

By using the process of this invention for connecting optical fibers, a smooth bonding can be achieved by a simple procedure in the connecting work of optical fibers which has hitherto necessitated very high precision and technique. Thus, the optical fibers connected according to the process of this invention have a very small irregular reflection of transmitted light at the connected part and have a high efficiency in the transmission of optical communication signals.

What is claimed is:

1. A lightguide comprising a plurality of optical fibers having substantially the same diameter which are end connected together with their optical axes aligned by means of a photo-setting type adhesive, said adhesive having substantially the same diameter as that of said optical fibers.

2. A lightguide according to claim 1, wherein said photo-setting type adhesive is a resin curable with ultraviolet rays.

3. A process for producing a lightguide which comprises the steps of tightly contacting together a plurality of optical fibers having substantially the same diameter and aligned optical axes at their end surfaces with a photo-setting type adhesive being present between said end surfaces, projecting a light into said optical fibers and into said adhesive to cure said adhesive by means of the light passing through the inside of said optical fibers; and, removing uncured adhesive which exists around the adhesive cured by the light passing through the inside of the optical fibers so that the diameter of the adhesive is substantially the same as that of said optical fibers.

4. A process for producing a lightguide according to claim 3, wherein said uncured adhesive is removed by means of a solvent.

5. A process for producing a lightguide according to claim 3, wherein said light is projected into said optical fibers from end surfaces thereof.

6. A process for producing a lightguide according to claim 3, wherein said light is projected into said optical fibers from lateral surfaces thereof in the vicinity of the point of contact of said optical fibers.

* * * * *